US010647260B2

United States Patent
Iida et al.

(10) Patent No.: US 10,647,260 B2
(45) Date of Patent: May 12, 2020

(54) VEHICLE SURROUNDINGS DISPLAY DEVICE

(71) Applicant: TOYOTA JIDOSHA KABUSHIKI KAISHA, Toyota-shi, Aichi-ken (JP)

(72) Inventors: Tomoaki Iida, Okazaki (JP); Tomoyuki Yoshida, Nisshin (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 0 days.

(21) Appl. No.: 16/411,564

(22) Filed: May 14, 2019

(65) Prior Publication Data
US 2019/0359141 A1 Nov. 28, 2019

(30) Foreign Application Priority Data

May 24, 2018 (JP) ................................. 2018-099400

(51) Int. Cl.
*H04N 7/18* (2006.01)
*B60R 1/12* (2006.01)
*B60R 11/04* (2006.01)

(52) U.S. Cl.
CPC ............... *B60R 1/12* (2013.01); *B60R 11/04* (2013.01); *B60R 2001/1215* (2013.01); *B60R 2001/1253* (2013.01); *B60R 2300/105* (2013.01); *B60R 2300/205* (2013.01); *H04N 7/18* (2013.01)

(58) Field of Classification Search
CPC .. H04N 7/18; B60R 1/12; B60R 11/04; B60R 2001/1215; B60R 2001/1253; B60R 2300/105; B60R 2300/205

USPC ......................................................... 348/148
See application file for complete search history.

(56) References Cited

U.S. PATENT DOCUMENTS

| 2007/0035625 | A9* | 2/2007 | Hamdan | .................... B60R 1/00 |
| | | | | 348/148 |
| 2013/0293683 | A1* | 11/2013 | Zhou | .................... H04N 5/23238 |
| | | | | 348/47 |
| 2014/0132527 | A1* | 5/2014 | Wu | ....................... G06F 3/04883 |
| | | | | 345/173 |

(Continued)

FOREIGN PATENT DOCUMENTS

| DE | 102016112817 A1 | 1/2017 |
| JP | 2003-95028 A | 4/2003 |

(Continued)

*Primary Examiner* — Michael Lee
(74) *Attorney, Agent, or Firm* — Sughrue Mion, PLLC

(57) ABSTRACT

Cameras capture images of different regions in the surroundings of a vehicle, and plural captured images are displayed on a monitor. An operation section includes a four-way switch enabling input to instruct a movement direction of a range to display as an image on the monitor, and a selection switch enabling input to designate a target image out of the plural images. An electronic mirror switches between a mode in which an image display on the monitor is modified under a first operation condition in which the four-way switch has been operated in a state in which the target image has not been designated through the selection switch, and a mode in which an image display on the monitor is modified under a second operation condition in which the four-way switch has been operated in a state in which the target image has been designated through the selection switch.

14 Claims, 7 Drawing Sheets

(56) References Cited

U.S. PATENT DOCUMENTS

| | | |
|---|---|---|
| 2016/0129837 A1* | 5/2016 | Zhu .......................... B60R 1/00 345/173 |
| 2016/0185292 A1 | 6/2016 | Asai |
| 2016/0191794 A1* | 6/2016 | Varonos ............... H04N 5/2253 348/36 |
| 2016/0227123 A1 | 8/2016 | Nagase et al. |
| 2019/0135191 A1 | 5/2019 | Sunagawa et al. |

FOREIGN PATENT DOCUMENTS

| | | |
|---|---|---|
| JP | 2008-148059 A | 6/2008 |
| JP | 2016-124391 A | 7/2016 |
| WO | 2017/199888 A1 | 11/2017 |

\* cited by examiner

VEHICLE SURROUNDINGS DISPLAY DEVICE

CROSS-REFERENCE TO RELATED APPLICATION

This application is based on and claims priority under 35 USC 119 from Japanese Patent Application No. 2018-099400 filed on May 24, 2018, the disclosure of which is incorporated by reference herein.

BACKGROUND

Technical Field

The present disclosure relates to a vehicle surroundings display device.

Related Art

Japanese Patent Application Laid-Open (JP-A) No. 2008-148059 (Patent Document 1) discloses technology in which a composite image encompassing the entire periphery of a vehicle is generated from images of the surroundings of the vehicle captured by plural cameras. An operation lever in the form of a joystick, a confirmation switch, and a return switch are employed so as to enable a camera position, a camera view angle, a camera line of sight direction, and a camera viewpoint of a displayed image to be modified in order to a display a displayed image corresponding to a desired camera position.

Specifically, in a state prior to the confirmation switch being operated so as to be switched ON, tilting the operation lever toward the left side or the right side moves the camera position counterclockwise or clockwise about a circumferential direction of the vehicle, and tilting the operation lever toward the front side or the rear side modifies the camera view angle toward either a telescopic view or wider angle. When the confirmation switch is operated so as to be switched ON and the camera position and the camera view angle are confirmed, the camera line of sight direction and camera viewpoint are modified according to the operation of the operation lever.

Plural regions forming blind spots from the perspective of an occupant and regions that cannot be viewed without the occupant twisting their head around (these regions being referred to as restricted view regions hereafter) are present in the environs of a vehicle. Thus, plural optical mirrors, for example outer mirrors such as left and right door mirrors and an inner rear view mirror that reflect different restricted view regions to each other have hitherto been installed in vehicles. These optical mirrors enable the occupant to view the situation in the respective restricted view regions while still facing the front. Moreover, left and right outer mirrors are generally configured as electric mirrors since the mirror orientation would otherwise be difficult to adjust while traveling. This enables the mirror orientation to be adjusted remotely by the occupant. An operation section of an electric optical mirror device includes a four-way switch to instruct movement of the mirror orientation in four separate directions, these being upward, downward, left, and right directions, and a selection switch to select a mirror as a target for adjustment using the four-way switch.

In recent years, in place of optical mirrors such as described above, as in Patent Document 1, for example, so-called electronic mirrors have been proposed in which a camera captures images of the environs of a vehicle, and an image representing the environs of the vehicle is displayed on a display section. However, mirrors that assist viewing of a restricted view region are safety components, and if an operation interface of an electronic mirror differs greatly from the operation interfaces of an existing electric optical mirror device, an occupant accustomed to the operation of the existing electric optical mirror device might feel some uncertainty, leading to an undesirable reduction in ease of operation. Moreover, in cases in which an electronic mirror or an electric optical mirror device are selectively installed in vehicles of the same model, if the configurations of operation sections of the electronic mirror and the electric optical mirror device are different from each other, for example having different numbers of switches, this leads to an undesirable increase in costs and so on.

By contrast, in the technology of Patent Document 1, a single image is displayed, and a camera position, a camera view angle, and so on of this single image are adjustable. In order to act as a substitute for existing optical mirrors, plural restricted view regions need to be simultaneously displayed as plural images. In cases in which the technology of Patent Document 1 is applied in a mode in which plural images are simultaneously displayed, the need arises to add switches and so on to the operation section in order to select a target image. Moreover, in the technology of Patent Document 1, in a state prior to the confirmation switch being operated so as to be switched ON, the camera position or the camera view angle is modified corresponding to whether the operation lever is being tilted left or right or tilted up or down. A further issue arises in the respect that the operation interface greatly differs from the operation interfaces of existing electric optical mirror devices in which the mirror orientation is moved in four directions (up, down, left, and right) when the four-way switch is operated.

SUMMARY

In consideration of the above circumstances, an object of the present disclosure is to obtain a vehicle surroundings display device capable of suppressing the difference in configuration of an operation section and the difference in an operation interface in comparison to those of an existing electric optical mirror device.

A vehicle surroundings display device according to a first aspect includes plural imaging sections that each image a different region in surroundings of a vehicle, at least one display section that displays plural images captured by the imaging sections, an operation section including a first operation section enabling input of an operation to instruct a movement direction of a range to display as an image on the display section, and a second operation section enabling input of an operation to designate a target image out of the plural images, and a display controller that is configured to switch between a mode in which an image display on the display section is modified under a first operation condition in which the first operation section has been operated in a state in which the target image has not been designated using the second operation section, and a mode in which an image display on the display section is modified under a second operation condition in which the first operation section has been operated in a state in which the target image has been designated using the second operation section.

In the first aspect, different regions in the surroundings of the vehicle are imaged by the plural imaging sections, and the plural images captured by the imaging section are displayed on the at least one display section. The operation section includes the first operation section enabling input of an operation to instruct a movement direction of a range to display as an image on the display section, and the second operation section enabling input of an operation to designate a target image out of the plural images. There is accordingly essentially no difference to existing electric optical mirror devices in terms of the configuration of the operation section.

The display controller is configured to switch between the mode in which image display on the display section is modified under the first operation condition in which the first operation section has been operated in a state in which the target image has not been designated using the second operation section, and the mode in which image display on the display section is modified under the second operation condition in which the first operation section has been operated in a state in which the target image has been designated using the second operation section. In existing electric optical mirror devices, processing to adjust the orientation of a mirror is performed in a manner corresponding to the second operation condition, and there is no processing allocated to the first operation condition. This is exploited in the first aspect in which image display on the display section is modified under both the first operation condition and the second operation condition, and the modes by which image display on the display section is modified are switched between the first operation condition and the second operation condition.

Thus, difference from the operation interface of an existing electric optical mirror device is suppressed. This suppresses any reservation felt by an occupant accustomed to the operation of the existing electric optical mirror device. The first aspect thereby enables difference from the configuration of an operation section and difference from an operation interface of an existing electric optical mirror device to be suppressed.

The first aspect may be configured as in a second aspect for example, such that under the first operation condition, the display controller modifies respective view angles of the plural images displayed on the display section. Processing to modify the view angles of the images displayed on the display section is processing that is not performed in existing electric optical mirror devices. In the second aspect, the processing to modify the view angle is allocated to the first operation condition to which processing is not allocated in existing electric optical mirror devices. This enables the difference from the operation interface of an existing electric optical mirror device to be further reduced, and enables any reservation felt by an occupant accustomed the operation of the existing electric optical mirror device to be further suppressed.

The first aspect or the second aspect may be configured as in a third aspect for example, such that under the second operation condition, the display controller moves a display range of the target image designated using the second operation section on the display section in a direction corresponding to operation of the first operation section. In existing electric optical mirror devices, processing to adjust the orientation of a mirror is performed in a manner corresponding to the second operation condition. In the third aspect, processing to move the display range of the image on the display section, this being similar to the processing to adjust the orientation of a mirror, is allocated to the second operation condition. This enables the difference from the operation interface of an existing electric optical mirror device to be further reduced, and enables any reservation felt by an occupant accustomed to the operation of the existing electric optical mirror device to be further suppressed.

The second aspect may be configured as in a fourth aspect for example, such that the display controller modifies the view angle between a first view angle that is a standard view angle, and a second view angle that is a wider angle than the first view angle.

The fourth aspect may be configured as in a fifth aspect for example, such that, in cases in which the first operation section is operated again or the second operation section has been operated in a state in which an image is being displayed on the display section at the second view angle, the display controller modifies the view angle of the image to the first view angle.

The fourth aspect may be configured as in a sixth aspect for example, such that, in cases in which a vehicle speed of the vehicle is a predetermined value or greater in a state in which an image is being displayed on the display section at the second view angle, the display controller modifies the view angle of the image to the first view angle. When the image displayed on the display section is modified from the second view angle to the first view angle, the size of an image region of the image displayed on the display section corresponding to an object present in the environs of the vehicle is increased. An occupant therefore more easily recognizes the presence of these objects during vehicle travel. This enables safety during vehicle travel to be improved by modifying from the second view angle to the first view angle in cases in which the vehicle speed of the vehicle is the predetermined value or greater.

Any one of the fourth to the sixth aspect may be configured as in a seventh aspect for example, such that, in a state in which an image is being displayed on the display section at the first view angle, the display controller stores a display range for displaying images on the display section in a storage section, and in cases in which the view angle of an image is modified to the first view angle from a state in which the image is being displayed on the display section at the second view angle, the display controller displays an image on the display section corresponding to the display range stored in the storage section.

Thus, in cases in which the view angle of the image displayed on the display section is modified from the second view angle to the first view angle, an image in the same display range as an image previously displayed at the first view angle is displayed on the display section. This reduces the likelihood of needing to adjust the display range of the image displayed on the display section at the first view angle when modifying from the second view angle to the first view angle, thereby enabling ease of operation to be improved.

Any one of the first to the seventh aspect may be configured as in an eighth aspect for example, such that the vehicle surroundings display device is an electronic outer mirror device installed in the vehicle.

The present disclosure has an advantageous effect of enabling difference in configuration of an operation section and the difference in an operation interface in comparison to those of an existing electric optical mirror device to be suppressed.

BRIEF DESCRIPTION OF THE DRAWINGS

Exemplary embodiments of the present disclosure will be described in detail based on the following figures, wherein.

DETAILED DESCRIPTION

Figure 1:
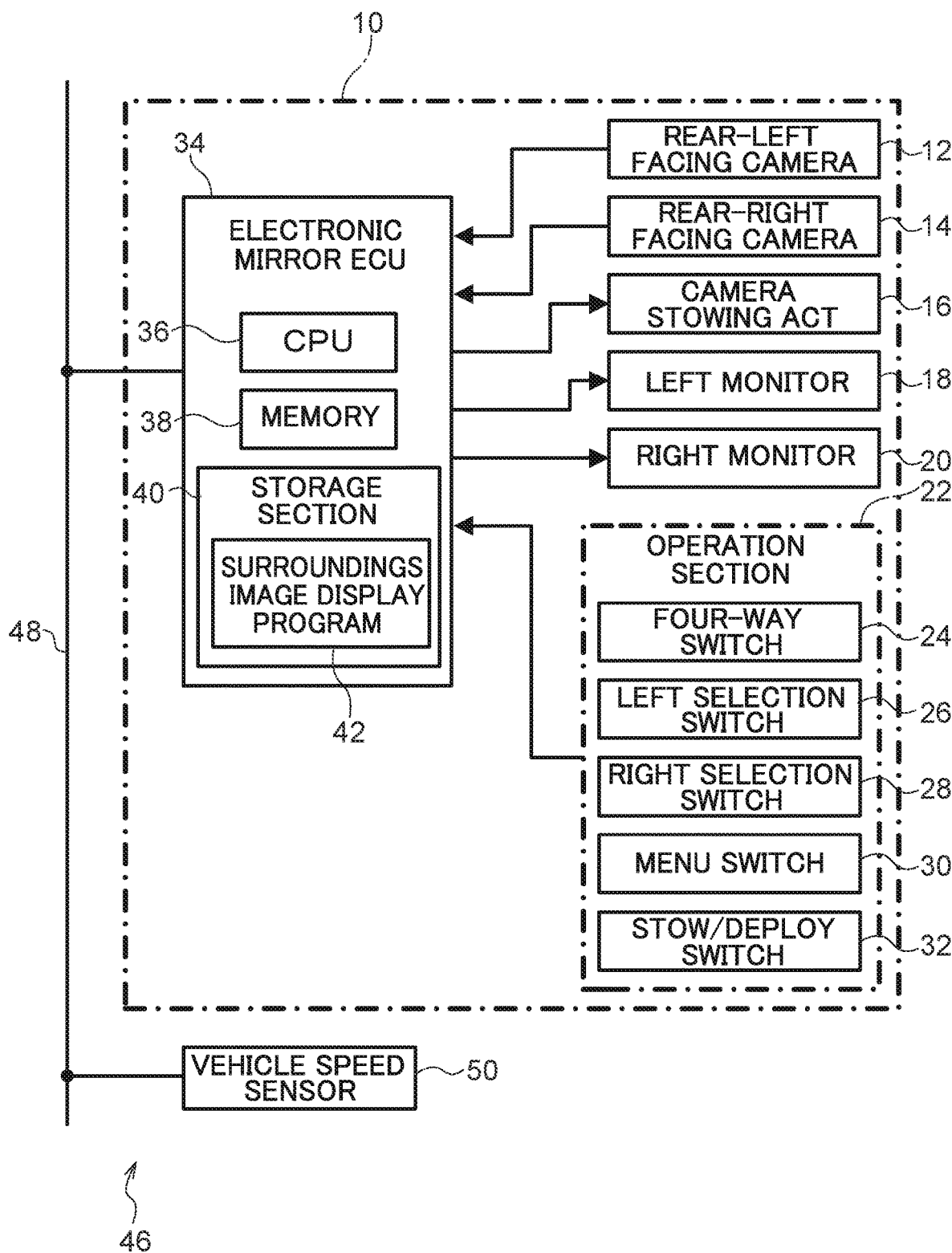
FIG. 1 is a block diagram illustrating a schematic configuration of an onboard system including an electronic outer mirror device according to an exemplary embodiment.

Detailed explanation follows regarding an example of an exemplary embodiment of the present disclosure, with reference to the drawings. As illustrated in FIG. 1, an onboard system 46 includes a bus 48. Plural electronic control units, which perform different control to each other, and plural sensor units are each connected to the bus 48. Note that only parts of the onboard system 46 that are relevant to the present disclosure are illustrated in FIG. 1. Each of the electronic control units is a control unit including a CPU, memory, and a non-volatile storage section, and is hereafter referred to as an ECU. An electronic mirror ECU 34 is included among the plural ECUs connected to the bus 48. A vehicle speed sensor 50 is included in the plural sensor units connected to the bus 48.

A rear-left facing camera 12, a rear-right facing camera 14, a camera stowing actuator (ACT) 16, a left monitor 18, a right monitor 20, and an operation section 22 (an operation interface) are each connected to the electronic mirror ECU 34. The electronic mirror ECU 34, the rear-left facing camera 12, the rear-right facing camera 14, the camera stowing ACT 16, the left monitor 18, the right monitor 20, and the operation section 22 collectively configure an electronic outer mirror device 10. The electronic outer mirror device 10 is an example of a vehicle surroundings display device. In the electronic outer mirror device 10, the rear-left facing camera 12 and the rear-right facing camera 14 are an example of plural imaging sections, the left monitor 18 and the right monitor 20 are an example of a display section, the operation section 22 is an example of an operation section, and the electronic mirror ECU 34 is an example of a display controller.

Figure 2:
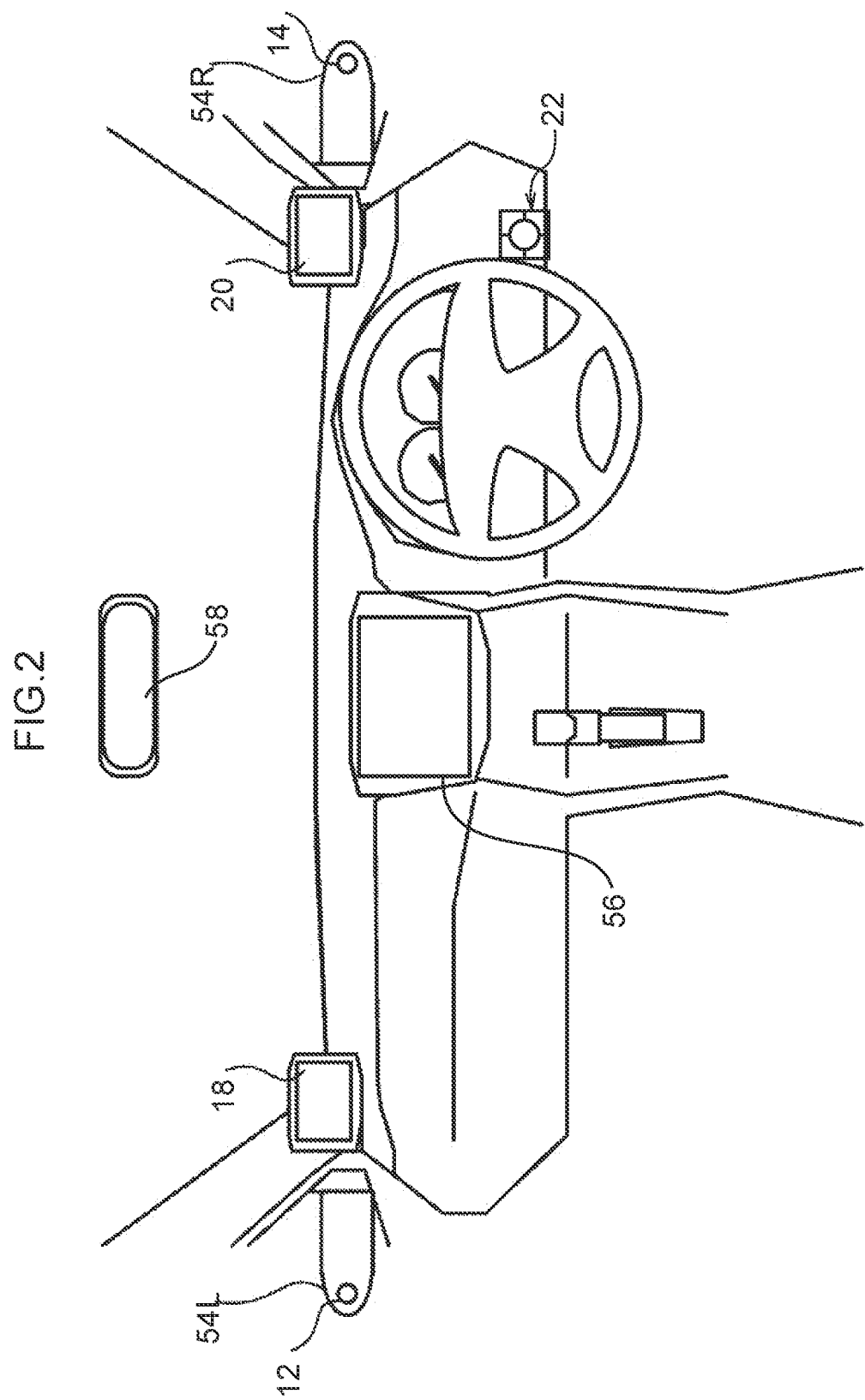
FIG. 2 is a perspective view illustrating layout positions of cameras and monitors of an electronic outer mirror device.

As illustrated in FIG. 2, a base portion of a substantially rectangular block shaped camera support body 54L is attached to a vehicle front side end portion of a vehicle vertical direction intermediate section of a left side door (front side door, not illustrated in the drawings) of a vehicle, such that a circular arc shaped leading end portion of the camera support body 54L projects toward the vehicle outer side. The rear-left facing camera 12 is attached near to the leading end portion of the camera support body 54L. An imaging optical axis (lens) of the rear-left facing camera 12 is directed toward the rear-left of the vehicle, and captures images at the rear-left of the vehicle. The camera support body 54L is capable of swinging in the vehicle front-rear direction under drive force of the camera stowing ACT 16 so as to be swung to a stowed position where the length direction of the camera support body 54L substantially follows an outer side face of the vehicle, or to a deployed position where the rear-left facing camera 12 captures images at the rear-left of the vehicle.

A base portion of a camera support body 54R, which has a profile with left-right symmetry to the camera support body 54L, is attached to a vehicle front side end portion of a vehicle vertical direction intermediate section of a right side door (front side door, not illustrated in the drawings) of the vehicle. The rear-right facing camera 14 is attached near to a leading end portion of the camera support body 54R. An imaging optical axis (lens) of the rear-right facing camera 14 is directed toward the rear-right of the vehicle, and captures images at the rear-right of the vehicle. The camera support body 54R is also capable of swinging in the vehicle front-rear direction under drive force of the camera stowing ACT 16 so as to be swung to a stowed position where the length direction of the camera support body 54R substantially follows an outer side face of the vehicle, or to a deployed position where the rear-right facing camera 14 captures images at the rear-right of the vehicle.

Note that in the present exemplary embodiment, the lenses of the rear-left facing camera 12 and the rear-right facing camera 14 each have a fixed focal point and a relatively wide view angle. Mechanisms to modify the orientations of the imaging optical axes are not provided. Thus, in a state in which the camera support body 54L is positioned in the deployed position, the rear-left facing camera 12 captures images of a relatively wide, fixed imaging region at the rear-left of the vehicle. In a state in which the camera support body 54R is positioned in the deployed position, the rear-right facing camera 14 captures images of a relatively wide, fixed imaging region at the rear-right of the vehicle.

The left monitor 18 is provided in a vehicle cabin interior near to a lower end of a left front pillar. An image (video image) representing the rear-left captured by the rear-left facing camera 12 is displayed on the left monitor 18 by the electronic mirror ECU 34. Namely, the left monitor 18 has a function replacing that of a left outer mirror. An occupant is able to check the situation in a restricted view region at the rear-left of the vehicle by viewing the image displayed on the left monitor 18.

The right monitor 20 is provided in the vehicle cabin interior near to a lower end of a right front pillar. An image (video image) representing the rear-right captured by the rear-right facing camera 14 is displayed on the right monitor 20 by the electronic mirror ECU 34. Namely, the right monitor 20 has a function replacing that of a right outer mirror. The occupant is able to check the situation in a restricted view region at the rear-right of the vehicle by viewing the image displayed on the right monitor 20.

A central monitor 56 is provided at a central portion of an instrument panel of the vehicle. An inner rear view mirror 58 is provided at a position separate from and at the vehicle upper side of the central monitor 56. In the present exemplary embodiment, the inner rear view mirror 58 is an optical mirror. The orientation of the mirror surface of the inner rear view mirror 58 is adjusted so as to reflect a restricted view region behind the vehicle.

Figure 3:
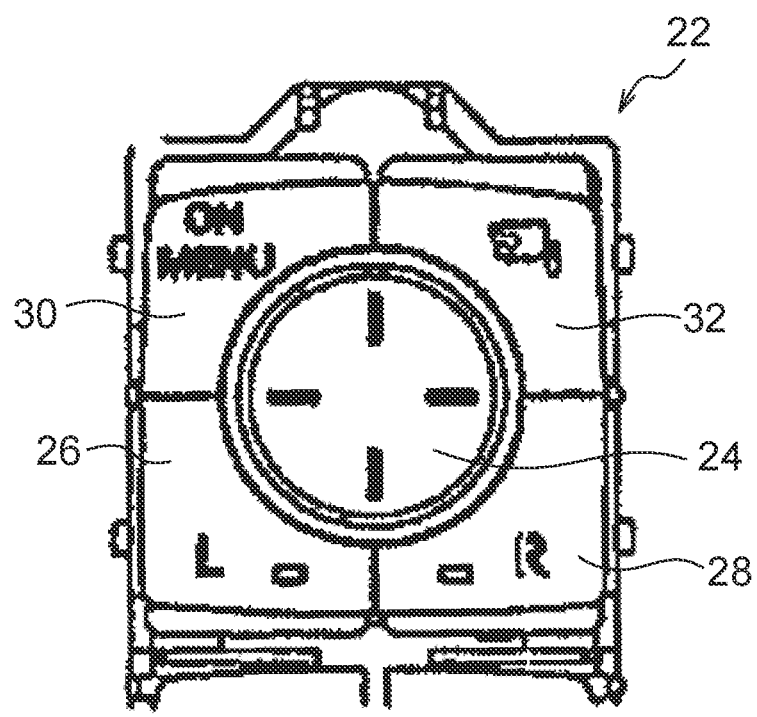
FIG. 3 is a plan view illustrating operation keys provided to an operation section.

The operation section 22 is an operation interface disposed toward the vehicle lower side of a right end of the instrument panel. As illustrated in FIG. 3, the operation section 22 includes a four-way switch 24 that enables input of an operation to instruct a movement direction of an image display range of the left monitor 18 or the right monitor 20. The movement is split into four directions corresponding to the upper, lower, left, and right directions of the vehicle. More specifically, the four-way switch 24 includes four switches respectively corresponding to the upper, lower, left, and right directions, and the respective switches are switched ON by pressing an operation button of the four-way switch 24 at different locations (namely, on the upper side, the lower side, the left side, or the right side of the operation button). The occupant is therefore able to instruct a desired direction out of the four directions by selecting and pressing a corresponding pressing location on the operation button of the four-way switch 24.

The operation section 22 also includes a left selection switch 26 enabling selection of a display image on the left monitor 18 as an instruction target of the four-way switch 24, and a right selection switch 28 enabling designation of a display image on the right monitor 20 as an instruction target of the four-way switch 24. The left selection switch 26 and the right selection switch 28 are switched between an ON state and an OFF state each time they are pressed. The operation section 22 also includes a menu switch 30 enabling instruction of a menu screen display, and a stow/deploy switch 32 enabling instruction of swinging of the camera support bodies 54L, 54R. Note that the operation section 22 is an example of an operation section, the four-way switch 24 is an example of a first operation section, and the left selection switch 26 and the right selection switch 28 are an example of a second operation section.

As illustrated in FIG. 1, the electronic mirror ECU 34 includes a CPU 36, memory 38, and a storage section 40, which is a non-volatile memory. A surroundings image display program 42 is stored in the storage section 40. The electronic mirror ECU 34 performs surroundings image display processing, described later, by reading the surroundings image display program 42 from the storage section 40, expanding the surroundings image display program 42 in the memory 38, and executing the surroundings image display program 42 expanded in the memory 38 using the CPU 36.

Explanation follows regarding operation of the present exemplary embodiment. Each time the stow/deploy switch 32 of the operation section 22 is operated, the electronic mirror ECU 34 swings the camera support bodies 54L, 54R to either the stowed position or the deployed position using the camera stowing ACT 16. When the menu switch 30 is switched ON, the electronic mirror ECU 34 displays a menu screen in which plural items relating to the electronic outer mirror device 10 are displayed in a selectable list on the right monitor 20 or the central monitor 56, for example. For example, the items displayed in the list on the menu screen include brightness adjustment of the images displayed on the left and right monitors 18, 20. The occupant operates the four-way switch 24, the left selection switch 26, or the right selection switch 28 to select particular items, instruct adjustment of the image brightness, or the like. Detailed explanation thereof is omitted herein.

Figure 4:
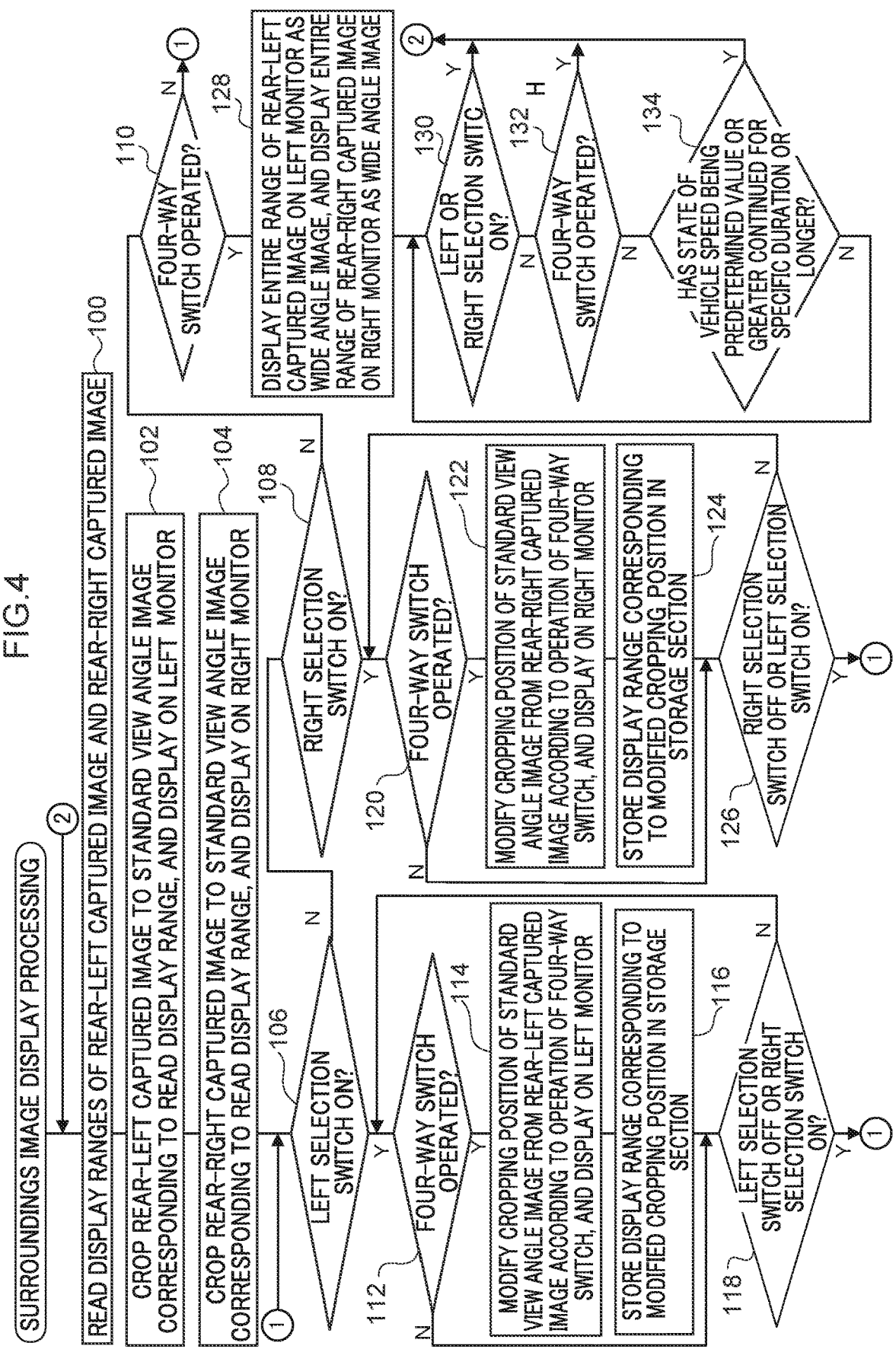
FIG. 4 is a flowchart illustrating surroundings image display processing executed by an electronic mirror ECU.

The electronic mirror ECU 34 performs the surroundings image display processing illustrated in FIG. 4 while an ignition switch of the vehicle is switched ON, and the camera support bodies 54L, 54R are positioned in their respective deployed positions. Explanation follows regarding this surroundings image display processing.

Figure 5:
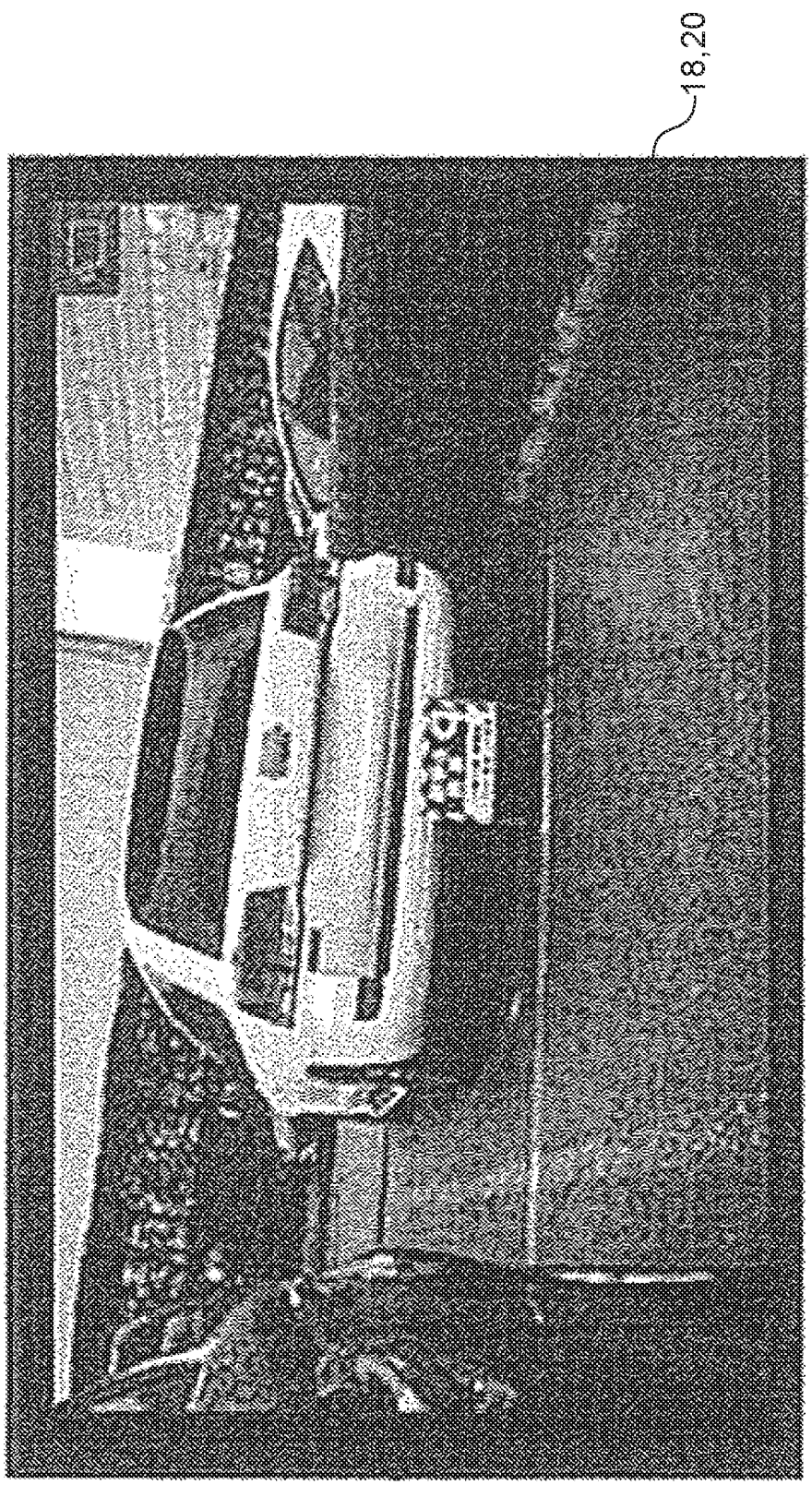
FIG. 5 is an illustration of an example of a wide angle image displayed on a monitor.

The image illustrated in FIG. 5 corresponds to the entire range of an example image captured by the rear-right facing camera 14 (or the rear-left facing camera 12). In cases in which display of a wide angle image has not been instructed, the electronic mirror ECU 34 crops an image in a display range corresponding to a standard view angle from both left and right captured images captured by the cameras 12, 14, and resizes the cropped images electronically for display over the entire screens of the left and right monitors 18, 20.

Figure 6:
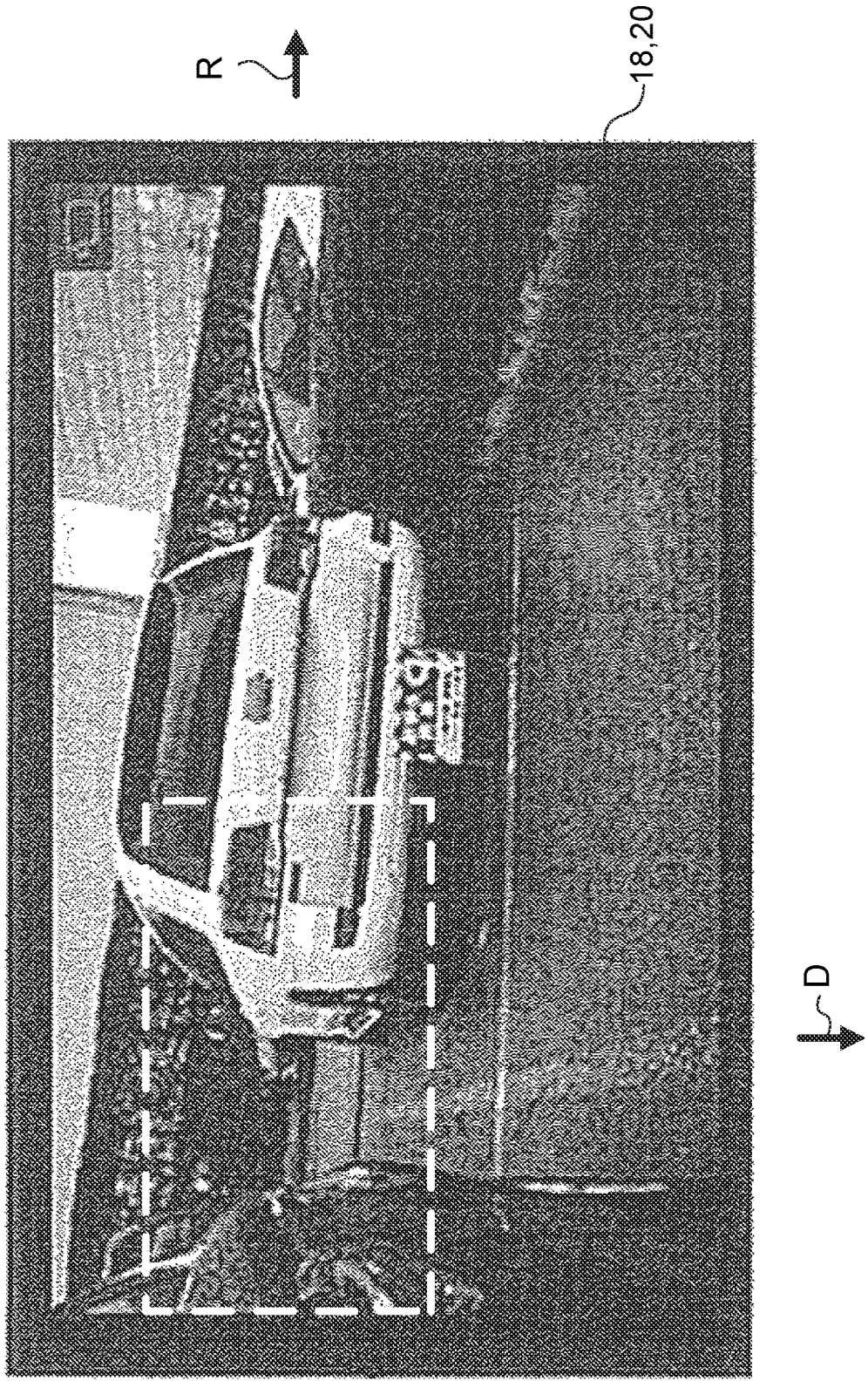
FIG. 6 is an illustration of a cropping range from a wide angle image superimposed on the wide angle image.
Figure 7:
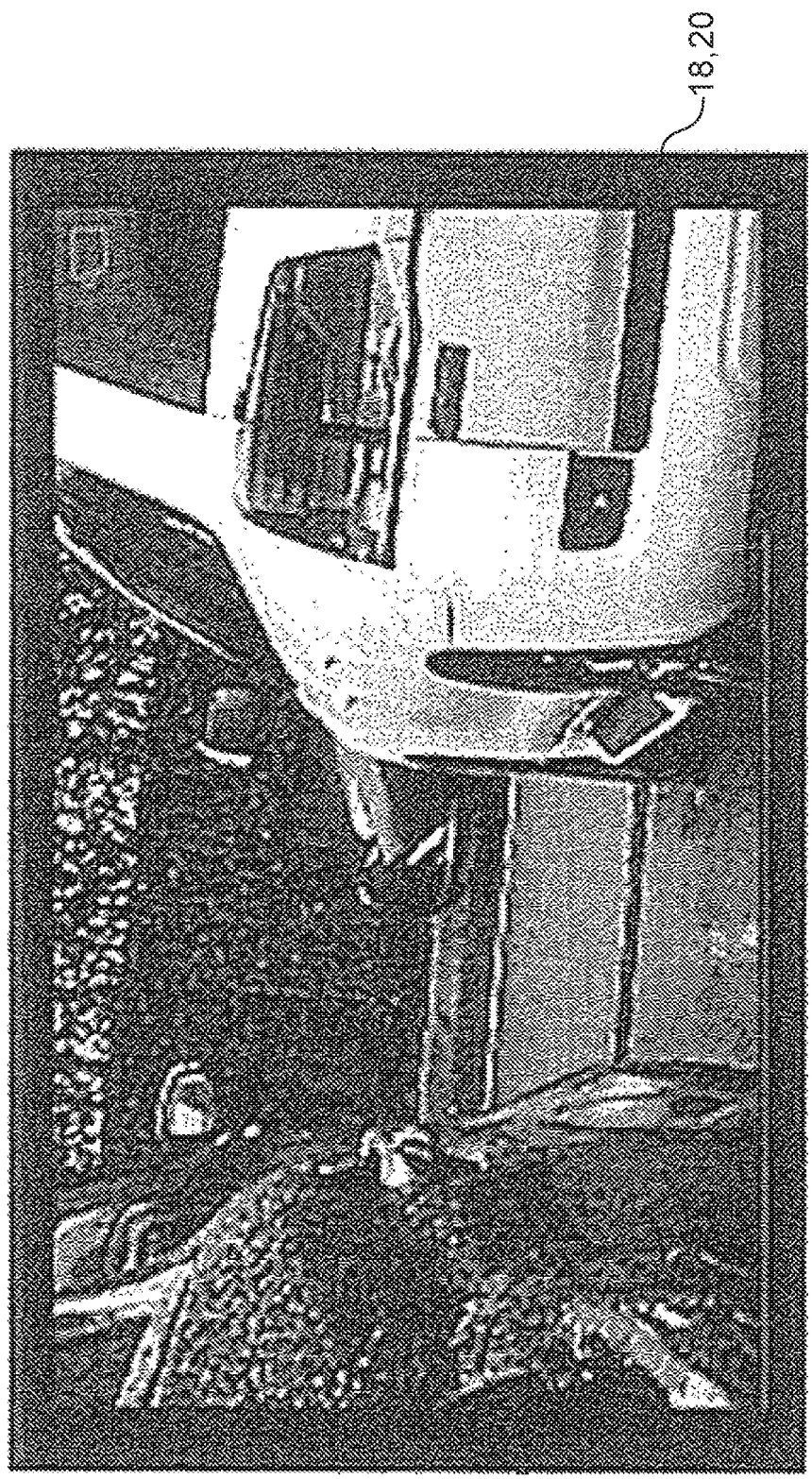
FIG. 7 is an illustration of an example of a standard view angle image for display on a monitor, in which the cropping range illustrated in FIG. 6 has been cropped from the wide angle image.

FIG. 6 illustrates an example of a display range corresponding to a standard view angle set with respect to the captured image illustrated in FIG. 5, as framed by white intermittent lines. FIG. 7 illustrates an example of an image at the standard view angle displayed on the monitor 18 or 20 in a case in which the display range corresponds to the position illustrated in FIG. 6. Separate display range positions set with respect to the captured images are stored for the left and right in the storage section 40.

At step 100 of the surroundings image display processing, the electronic mirror ECU 34 reads the respective display range positions set for a rear-left captured image captured by the rear-left facing camera 12 and for a rear-right captured image captured by the rear-right facing camera 14 from the storage section 40. Note that initial display range positions may for example be positions corresponding to the respective centers of the rear-left captured image and the rear-right captured image.

At step 102, based on the display range position set for the rear-left captured image read at step 100, the electronic mirror ECU 34 crops the rear-left captured image to an image corresponding to the inside of the display range when the display range is disposed at the aforementioned position on the rear-left captured image. The electronic mirror ECU 34 then electronically resizes the image cropped from the rear-left captured image to be displayed over the entire screen of the left monitor 18 as a standard view angle image.

At step 104, based on the display range position set for the rear-right captured image read at step 100, the electronic mirror ECU 34 crops the rear-right captured image to an image corresponding to the inside of the display range when the display range is disposed at the aforementioned position on the rear-right captured image. The electronic mirror ECU 34 then electronically resizes the image cropped from the rear-right captured image to be displayed over the entire screen of the right monitor 20 as a standard view angle image. An example of a standard view angle image displayed on the monitor 18 or 20 at step 102 or 104 is illustrated in FIG. 7. The view angle of the standard view angle image is an example of a first view angle.

At step 106, the electronic mirror ECU 34 determines whether or not the left selection switch 26 has been switched ON. In cases in which determination is negative at step 106 processing transitions to step 108. At step 108, the electronic mirror ECU 34 determines whether or not the right selection switch 28 has been switched ON. In cases in which determination is negative at step 108 processing transitions to step 110. At step 110, the electronic mirror ECU 34 determines whether or not the four-way switch 24 has been operated. In cases in which determination is also negative at step 110 processing returns to step 106. Steps 106, 108, and 110 are then repeated until determination is affirmative at one out of the steps 106, 108, or 110.

In a state in which steps 106, 108, and 110 are being repeated, if the left selection switch 26 is switched ON due to the occupant press operating the left selection switch 26 of the operation section 22, determination is affirmative at step 106 and processing transitions to step 112. At step 112, the electronic mirror ECU 34 determines whether or not the four-way switch 24 has been operated. In cases in which determination is negative at step 112 processing transitions to step 118. At step 118, the electronic mirror ECU 34 determines whether or not the left selection switch 26 has been switched OFF, or whether or not the right selection switch 28 has been switched ON. In cases in which determination is negative at step 118 processing returns to step 112, and the processing of steps 112 and 118 is repeated until determination is affirmative at either step.

In a state in which the left selection switch 26 is switched ON and steps 112, 118 are being repeated, in cases in which any of the switches included in the four-way switch 24 is switched ON by the occupant performing a press operation at a desired location on the four-way switch 24 of the operation section 22, determination is affirmative at step 112 and processing transitions to step 114. Note that an operation condition of affirmative determination at step 112 is an example of a second operation condition. At step 114, the electronic mirror ECU 34 moves the position of the display range set with respect to a rear-left captured image according to the operation of the four-way switch 24.

Specifically, in cases in which the switch of the four-way switch 24 corresponding to the upward direction has been switched ON, as illustrated by the arrow U in FIG. 6, the position of the display range on the rear-left captured image is moved in the upward direction at a constant speed while the switch remains ON. In cases in which the switch of the four-way switch 24 corresponding to the downward direction has been switched ON, as illustrated by the arrow D in FIG. 6, the position of the display range on the rear-left captured image is moved in the downward direction at a constant speed while the switch remains ON. In cases in which the switch of the four-way switch 24 corresponding to the left direction has been switched on, as illustrated by the arrow L in FIG. 6, the position of the display range on the rear-left captured image is moved in the left direction at a constant speed while the switch remains ON. However, in the example illustrated in FIG. 6, since the display range is positioned at a left edge of the rear-left captured image, movement of the display range in the left direction is cancelled in this example. In cases in which the switch of the four-way switch 24 corresponding to the right direction has been switched ON, as illustrated by the arrow R in FIG. 6, the position of the display range on the rear-left captured image is moved in the right direction at a constant speed while the switch remains ON.

After the position of the display range has been moved in the above manner, the electronic mirror ECU 34 crops an image corresponding to the display range after being moved from the rear-left captured image, and electronically resizes the image cropped from the rear-left captured image to be displayed over the entire screen of the left monitor 18 as a standard view angle image. Next, at step 116, the electronic mirror ECU 34 stores the position of the display range after being moved in the storage section 40, and processing transitions to step 118.

Thus, while the left selection switch 26 remains in an ON state, each time the four-way switch 24 is operated, the position of the display range on the rear-left captured image is moved according to operation of the four-way switch 24, the standard view angle image displayed on the left monitor 18 is switched according to the movement of the display range, and the position of the display range with respect to the rear-left captured image stored in the storage section 40 is updated to the position of the display range after being moved.

In a state in which steps 112 and 118 are being repeated, if the left selection switch 26 is switched OFF due to the occupant repeating press operation of the left selection switch 26, or if the right selection switch 28 is switched ON by the occupant performing a press operation of the right selection switch 28, determination is affirmative at step 118, and processing returns to the loop of steps 106, 108, and 110.

Note that if the right selection switch 28 is switched ON, the left selection switch 26 that was in the ON state is automatically switched OFF.

In a state in which steps 106, 108, and 110 are being repeated, if the right selection switch 28 of the operation section 22 is switched ON due to the occupant performing a press operation of the right selection switch 28, determination is affirmative at step 108 and processing transitions to step 120. At step 120, the electronic mirror ECU 34 determines whether or not the four-way switch 24 has been operated. In cases in which determination is negative at step 120 processing transitions to step 126. At step 126, the electronic mirror ECU 34 determines whether or not the right selection switch 28 has been switched OFF, or whether or not the left selection switch 26 has been switched ON. In cases in which determination is negative at step 126 processing returns to step 120, and the processing of steps 120 and 126 is repeated until determination is affirmative at either step.

In a state in which the right selection switch 28 is switched ON and steps 120, 126 are being repeated, in cases in which any of the switches included in the four-way switch 24 is switched ON by the occupant performing a press operation of a desired location on the four-way switch 24 of the operation section 22, determination is affirmative at step 120 and processing transitions to step 122. Note that an operation condition of affirmative determination at step 120 is an example of the second operation condition. At step 122, the electronic mirror ECU 34 moves the position of a display range set with respect to a rear-right captured image according to operation of the four-way switch 24, crops an image corresponding to the display range after being moved from the rear-right captured image, and electronically resizes the image cropped from the rear-right captured image for display over the entire screen of the right monitor 20 as a standard view angle image. Next, at step 124, the electronic mirror ECU 34 stores the position of the display range after being moved in the storage section 40, and processing transitions to step 126.

Thus, while the right selection switch 28 remains in an ON state, each time the four-way switch 24 is operated, the position of the display range on the rear-right captured image is moved according to operation of the four-way switch 24, the standard view angle image displayed on the right monitor 20 is switched according to the movement of the display range, and the position of the display range with respect to the rear-right captured image stored in the storage section 40 is updated to the position of the display range after being moved. In a state in which steps 120 and 126 are being repeated, if the right selection switch 28 is switched OFF, or if the left selection switch 26 is switched ON, determination is affirmative at step 126, and processing returns to the loop of steps 106, 108, and 110.

In a state in which steps 106, 108, and 110 are being repeated, in cases in which any of the switches included in the four-way switch 24 is switched ON by the occupant performing a press operation of a desired location on the four-way switch 24 of the operation section 22, determination is affirmative at step 110 and processing transitions to step 128. Note that an operation condition of affirmative determination at step 110 is an example of a first operation condition.

At step 128, the electronic mirror ECU 34 electronically resizes the entirety of the rear-left captured image captured by the rear-left facing camera 12 for display over the entire screen of the left monitor 18 as a wide angle image, and electronically resizes the entirety of the rear-right captured image captured by the rear-right facing camera 14 to be displayed over the entire screen of the right monitor 20 as a wide angle image. An example of a wide angle image displayed on the monitor 18, 20 at step 128 is illustrated in FIG. 5. By observing the wide angle images displayed on the monitors 18, 20, the occupant is able to check the situation at the rear-left and the rear-right of the vehicle, these being restricted view regions, over a comparatively wide range. Note that the view angle of a wide angle image is an example of a second view angle.

At step 130, the electronic mirror ECU 34 determines whether or not the left selection switch 26 or the right selection switch 28 has been switched ON. In cases in which determination is negative at step 130 processing transitions to step 132. At step 132, the electronic mirror ECU 34 determines whether or not the four-way switch 24 has been operated. In cases in which determination is negative at step 132 processing transitions to step 134. At step 134, the electronic mirror ECU 34 determines whether or not a state in which the vehicle speed detected by the vehicle speed sensor 50 is a predetermined value or greater has continued for a specific duration or longer. Note that an example of the predetermined value is 30 km/h, and an example of the specific duration is 15 seconds.

In cases in which determination is negative at step 132 processing returns to step 130. The processing of steps 130, 132, and 134 is then repeated until determination is affirmative at any of steps 130, 132, or 134. The wide angle images continue to be displayed on the left monitor 18 and the right monitor 20 while this is occurring.

In a state in which steps 130, 132, and 134 are being repeated, in cases in which the left selection switch 26 or the right selection switch 28 is switched ON, determination is affirmative at step 130 and processing returns to step 100. In the state in which steps 130, 132, and 134 are being repeated, in cases in which the four-way switch 24 is operated, determination is affirmative at step 132 and processing returns to step 100. In the state in which steps 130, 132, and 134 are being repeated, in cases in which the state in which the vehicle speed is the predetermined value or greater has continued for the specific duration or longer, determination is affirmative at step 134 and processing returns to step 100.

Thus, in any of the above cases, the images displayed on the monitors 18, 20 are switched from wide angle images to standard view angle images after performing steps 100 to 104. The ranges displayed as the standard view angle images when this is performed are the same as the display ranges stored in the storage section 40, namely, the display ranges when the standard view angle images were displayed directly prior to displaying the wide angle images.

Thus, in the present exemplary embodiment, different ranges of the vehicle surroundings are imaged by the cameras 12, 14, and the plural images captured by the cameras 12, 14 are displayed on the monitors 18, 20. The operation section 22 includes the four-way switch 24 enabling input of operations to instruct the movement direction of the range of an image to be displayed on the monitor 18 or 20, and the selection switches 26, 28 enabling input of an operation to designate a target image from out of the plural images. The electronic mirror ECU 34 switches between a mode in which the images displayed on the monitors 18, 20 are modified under the first operation condition in which the four-way switch 24 has been operated in a state in which a target image has not been designated using the selection switches 26, 28, and a mode in which an image displayed on the monitor 18 or 20 is modified under a second operation condition in which the four-way switch 24 is operated in a state in which a target image has been designated using the selection switch 26 or 28.

The configuration of the operation section 22 is accordingly essentially no different to that of an existing electric optical mirror device, and differences from existing electric optical mirror devices in terms of the operation interface are suppressed. This suppresses any uncertainty felt by an occupant accustomed to the operation of an existing electric optical mirror device. Thus, the present exemplary embodiment enables a difference in configuration of the operation section and a difference in the operation interface in comparison to that of an existing electric optical mirror device to be suppressed. Moreover, since there is essentially no difference between the configuration of the operation section 22 and that of an existing electric optical mirror device, in cases in which either the electronic outer mirror device 10 or an electric optical mirror device is selectively installed to the same model of vehicle, an increase in costs arising from differences in the configuration of the operation section 22 can be suppressed.

In the present exemplary embodiment, under the first operation condition, the electronic mirror ECU 34 modifies the respective view angles of the plural images displayed on the monitors 18, 20, thereby enabling the difference between the operation interface and that of an existing electric optical mirror device to be further reduced, and enabling any uncertainty felt by an occupant accustomed to the operation of the existing electric optical mirror device to be further suppressed.

In the present exemplary embodiment, under the second operation condition, the electronic mirror ECU 34 moves the display range of the target image on the monitor 18 or 20, as designated using the selection switch 26 or 28, in a direction corresponding to operation of the four-way switch 24. This enables the difference between the operation interface and that of an existing electric optical mirror device to be further reduced, thus enabling any uncertainty felt by an occupant accustomed to the operation of the existing electric optical mirror device to be further suppressed.

In the present exemplary embodiment, in cases in which the vehicle speed is the predetermined value or greater in the state in which the wide angle images are being displayed on the monitors 18, 20, the electronic mirror ECU 34 switches the displays to the standard view angle images. This increases the size of image regions corresponding to objects present in the environs of the vehicle in the images displayed on the monitors 18, 20. This makes it easier for an occupant to recognize the presence of these objects, enabling safety during vehicle travel to be improved.

In the present exemplary embodiment, the electronic mirror ECU 34 stores in the storage section 40 the display ranges of images on the monitors 18, 20 for the state in which standard view angle images are displayed on the monitors 18, 20. When switching display from the state in which the wide angle images are displayed on the monitors 18, 20 to the standard view angle images, the electronic mirror ECU 34 displays images on the monitors 18, 20 according to the display ranges stored in the storage section 40. This reduces the likelihood of needing to adjust the display ranges of the standard view angle images displayed on the monitors 18, 20 when the displays are switched from the wide angle images to the standard view angle images, thereby enabling ease of operation to be improved.

In the mode explained above, a function to modify the orientations of the imaging optical axes of the rear-left facing camera 12 and the rear-right facing camera 14 is not provided. However, there is no limitation thereto. For example, this function may be provided to the left and right cameras 12, 14, and the ranges displayed as images on the monitors 18, 20 may be moved by modifying the orientations of the imaging optical axes of the cameras 12, 14.

In the mode explained above, the lenses of the rear-left facing camera 12 and the rear-right facing camera 14 each have a fixed focal point and a comparatively wide view angle. However, there is no limitation thereto. For example, the lenses of the left and right cameras 12, 14 may be zoom lenses, and the view angles of the images displayed on the monitors 18, 20 may be modified by modifying the magnification of the zoom lenses.

In the mode explained above, the image displayed on the left monitor 18 is captured by the rear-left facing camera 12, and the image displayed on the right monitor 20 is captured by the rear-right facing camera 14. However, there is no limitation thereto. For example, plural cameras may be provided as cameras imaging at the left side of the vehicle, and a composite image of the images captured by these cameras may be displayed on the left monitor 18. Similarly, plural cameras may be provided as cameras imaging at the right side of the vehicle, and a composite image of the images captured by these cameras may be displayed on the right monitor 20.

In the mode explained above, the images captured by the left and right cameras 12, 14 are displayed on the left and right monitors 18, 20. However, there is no limitation thereto. For example, left and right images captured by the left and right cameras 12, 14 may be displayed on the central monitor 56. Alternatively, the inner rear view mirror 58 may be configured so as to be capable of displaying images, and the left and right images may be displayed thereon.

In the above description, the display range of the standard view angle images displayed on the left monitor 18 or the right monitor 20 is only moved in cases in which either the left selection switch 26 or the right selection switch 28 has been switched ON and the four-way switch 24 has been operated. However, there is no limitation thereto. For example, reverse-coordinated control, in which the display ranges of the standard view angle images are moved toward the vehicle lower side to facilitate viewing of obstacles at the lower side at the side of the vehicle while the vehicle is reversing, turning-coordinated control, in which the display ranges of the standard view angle images are moved in coordination with operation of a direction indicator to facilitate viewing behind the vehicle, or the like may be performed.

In the mode explained above, the view angles of the images displayed on the monitors 18, 20 are modified between two levels, these being the standard view angle images and the wide angle images. However, there is no limitation thereto. For example, the view angles may be modified in three or more plural increments, whereby in a state in which the left selection switch 26 and the right selection switch 28 are not switched ON, the view angles of the images are switched to a wider angle each time the switch of the four-way switch 24 corresponding to the upward direction is switched ON, and the view angles of the images are switched to a narrower angle each time the switch of the four-way switch 24 corresponding to the downward direction is switched ON.

In the mode explained above, the single electronic mirror ECU 34 is provided as the display controller of the left and right cameras 12, 14 and the left and right monitors 18, 20. However, there is no limitation thereto. For example, a first display controller controlling the rear-left facing camera 12 and the left monitor 18, and a second display controller controlling the rear-right facing camera 14 and the right monitor 20 may be respectively provided, with the first display controller and the second display controller being configured so as to communicate as required.

What is claimed is:

1. A vehicle surroundings display device comprising:
    a plurality of cameras that each image a different region surrounding a vehicle;
    at least one display that displays a plurality of images captured by the cameras, each of the plurality of images captured by a respective one of the cameras;
    an operation interface including a first operation switch enabling input of an operation to instruct a movement direction of a range to display as an image on a display of the at least one display, and a second operation switch enabling input of an operation to designate a target image from among the plurality of images, the target image being one of the plurality of images; and
    a display controller that includes a processor and a memory and that is configured to switch between a mode in which the display controller modifies an image displayed on the display under a first operation condition in which the first operation switch has been operated in a state in which the target image has not been designated using the second operation switch, and a mode in which the display controller modifies an image displayed on the display under a second operation condition in which the first operation switch has been operated in a state in which the target image has been designated using the second operation switch.

2. The vehicle surroundings display device of claim 1, wherein, under the first operation condition, the display controller modifies respective view angles of the plurality of images displayed on the at least one display.

3. The vehicle surroundings display device of claim 1, wherein, under the second operation condition, the display controller moves a display range of the target image designated using the second operation switch on the display in a direction corresponding to operation of the first operation switch.

4. The vehicle surroundings display device of claim 2, wherein, under the second operation condition, the display controller moves a display range of the target image designated using the second operation switch on the display section in a direction corresponding to operation of the first operation switch.

5. The vehicle surroundings display device of claim 2, wherein the display controller modifies the view angle between a first view angle that is a standard view angle, and a second view angle that is a wider angle than the first view angle.

6. The vehicle surroundings display device of claim 5, wherein, in cases in which the first operation switch is operated again or the second operation switch has been operated in a state in which an image is being displayed on the display at the second view angle, the display controller modifies the view angle of the image to the first view angle.

7. The vehicle surroundings display device of claim 5, wherein, in cases in which a vehicle speed of the vehicle is a predetermined value or greater in a state in which an image is being displayed on the display at the second view angle, the display controller modifies the view angle of the image to the first view angle.

8. The vehicle surroundings display device of claim 5, wherein:

in a state in which an image is being displayed on the display at the first view angle, the display controller stores a display range for displaying images on the display in the memory; and in cases in which the view angle of an image is modified to the first view angle from a state in which the image is being displayed on the display at the second view angle, the display controller displays an image on the display corresponding to the display range stored in the memory.

9. The vehicle surroundings display device of claim 6, wherein:

in a state in which an image is being displayed on the display at the first view angle, the display controller stores a display range for displaying images on the display in the memory; and in cases in which the view angle of an image is modified to the first view angle from a state in which the image is being displayed on the display at the second view angle, the display controller displays an image on the display corresponding to the display range stored in the memory.

10. The vehicle surroundings display device of claim 7, wherein:

in a state in which an image is being displayed on the display at the first view angle, the display controller stores a display range for displaying images on the display in the memory; and in cases in which the view angle of an image is modified to the first view angle from a state in which the image is being displayed on the display at the second view angle, the display controller displays an image on the display corresponding to the display range stored in the memory.

11. The vehicle surroundings display device of claim 1, wherein the vehicle surroundings display device is an electronic outer mirror device installed in the vehicle.

12. The vehicle surroundings display device of claim 2, wherein the vehicle surroundings display device is an electronic outer mirror device installed in the vehicle.

13. The vehicle surroundings display device of claim 3, wherein the vehicle surroundings display device is an electronic outer mirror device installed in the vehicle.

14. The vehicle surroundings display device of claim 5, wherein the vehicle surroundings display device is an electronic outer mirror device installed in the vehicle.

* * * * *